United States Patent [19]

Evans et al.

[11] 4,070,746

[45] Jan. 31, 1978

[54] METHOD FOR COVERING AN ARTICLE WITH A RECOVERABLE SLEEVE

[75] Inventors: Joseph H. Evans, Palo Alto; Richard B. Wolfe, Menlo Park, both of Calif.

[73] Assignee: Raychem Corporation, Menlo Park, Calif.

[21] Appl. No.: 720,611

[22] Filed: Sept. 3, 1976

Related U.S. Application Data

[62] Division of Ser. No. 587,267, June 16, 1975.

[51] Int. Cl.$^2$ .......................................... B23P 11/02
[52] U.S. Cl. ....................................... 29/450; 29/235; 156/344
[58] Field of Search ................. 29/423, 426, 450, 235; 156/344, 53, 86

[56] References Cited

U.S. PATENT DOCUMENTS

| | | | |
|---|---|---|---|
| 3,243,211 | 3/1966 | Wetmore | 156/86 UX |
| 3,250,050 | 5/1966 | Finger et al. | 29/450 X |
| 3,319,328 | 5/1967 | Finger et al. | 29/450 X |
| 3,390,033 | 6/1968 | Brown | 156/344 X |
| 3,411,971 | 11/1968 | Wood | 156/344 |
| 3,515,798 | 6/1970 | Sievert | 29/450 X |
| 3,669,824 | 6/1972 | Hess | 156/53 X |

*Primary Examiner*—Charlie T. Moon
*Attorney, Agent, or Firm*—Lyon & Lyon

[57] ABSTRACT

A recoverable tubular article comprising an elastomeric sleeve held in a radially expanded or extended condition and capable of recovering to its pre-expanded condition of smaller diameter upon the removal of an outer restraint, an outer restraint, essentially tubular in configuration, bonded to said elastomeric sleeve, said bond between the sleeve and the restraint being sufficiently strong to retain the elastomeric sleeve in its expanded condition under ordinary conditions of storage and susceptible to attack by solvents weakening the bond sufficiently to allow the elastomeric sleeve to peel away from the restraint and recover to its original state.

The article may be made by injection molding a rigid plastic material around an elastomeric sleeve, insuring that a suitable bond is formed between the sleeve and restraint, expanding said elastomeric sleeve when the plastic material is heated to softness and is formable and allowing the plastic material to cool and harden while the sleeve is held in the expanded state.

5 Claims, 6 Drawing Figures

METHOD FOR COVERING AN ARTICLE WITH A RECOVERABLE SLEEVE

This is a division of application Ser. No. 587,267, filed June 16, 1975.

BACKGROUND OF THE INVENTION

Heat recoverable sleeves have found wide utility in many applications. Thus, heat recoverable sleeves are used as insulators for electrical conductors, particularly at areas where splices are formed in the electrical conductors. The sleeves have been particularly successful because they allow rapid and uniform application of an insulating covering. Typically, an electrical conductor which is to be spliced or repaired first has an expanded heat recoverable sleeve placed over the conductor. The repair is then made and the sleeve is put in place over the splice and recovered by the application of heat. Such methods have proven to be quicker, more convenient, and more reliable than prior methods such as taping and vulcanizing.

A disadvantage in use of heat recoverable sleeves is that a heat source is necessary for the recovery. Suitable heat sources include torches and hot air guns. In some cases, it is undesirable to use torches because of the danger of fire being started by the open flame. In other situations, working conditions are so cramped or otherwise difficult that it is not convenient to place a heat source such as a torch or heat gun close to the sleeve which is to be recovered. The use of heat-recoverable sleeves may also be undesirable where the substrate on which the sleeve is to be shrunk is temperature sensitive.

Various methods of recovering sleeves without the application of heat have been proposed. In particular, various types of expanded sleeves with internal restraints holding the sleeves in the expanded condition have been disclosed. One such sleeve comprises an expanded sleeve held in the expanded state by a cylinder of ice as disclosed in U.S. Pat. No. 3,319,328. In actuality, such a sleeve is also a heat-recoverable sleeve because it requires a minimal amount of heat to melt the ice and allow the sleeve to recover. However, the heat necessary is so low that such a sleeve is not normally considered a sleeve requiring an application of an outside heat source. Another type of sleeve having an internal restraint is that described in U.S. Pat. No. 3,515,798 wherein a rigid removable mechanical insert holds the sleeve in the expanded condition until the insert is removed.

In general, all of the proposals for making recoverable sleeves which do not require heat have involved internal restraints, configurations which place a restraint between the substrate and the internal surface of the sleeve or involve contacting the internal surface of the sleeve with some foreign material. Such configurations present various problems.

Frequently, it is desired to coat the inner surface of a recoverable sleeve with a sealant or adhesive material. Configurations of heat recoverable sleeves with internal restraints often make the use of such a coating difficult or impossible. Furthermore, the imposition of an internal restraint between the sleeve and substrate makes fitting of the sleeve over the substrate difficult and reduces the range of substrate sizes which the sleeve can be fitted over.

SUMMARY OF THE PRESENT INVENTION

The present invention provides a recoverable sleeve which does not require the application of heat for recovery and which is held in the recoverable position by an external restraint. The extended sleeve is held in the position by a restraint bonded to the sleeve. The bond may be weakened or destroyed by the application of a solvent to the bond line.

DESCRIPTION OF THE PREFERRED EMBODIMENTS

The Recoverable Sleeve

Figure 1:
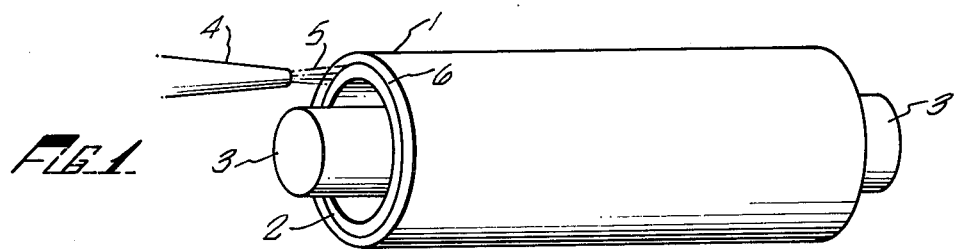
FIG. 1 is a perspective view of the article of the invention in position for being shrunk down about a substrate.
Figure 2:
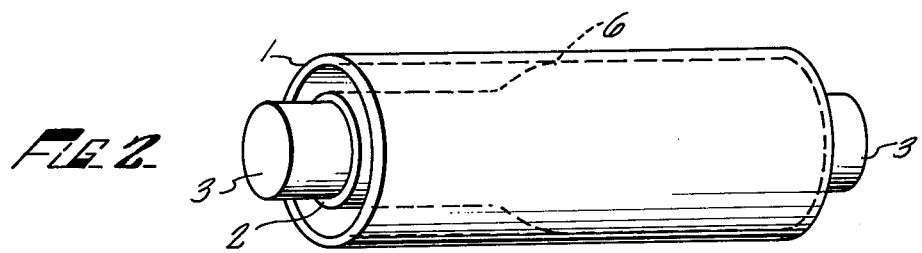
FIG. 2 is a perspective view of the article of the invention partially recovered about a substrate.

An article according to the present invention is shown in FIG. 1. It can be seen that the article comprises an outer rigid restraint 1 and an inner recoverable tube 2. The recoverable tube or sleeve is preferably fabricated from an elastomeric material. However, recoverable sleeves of other materials such as metallic split cylinders in tension may be used. The elastomeric sleeve must be capable of being stretched or expanded to an extended condition in the radial direction from which the sleeve can recover upon removal of the restraint holding it in the stretched or extended condition. For the elastomeric sleeve, virtually any desired material possessing elastomeric recovery properties may be used. The elastomeric material should be one which does not exhibit a substantial permanent set or decrease in recovery on storage. Suitable elastomers include materials such as natural and synthetic polyisoprenes, polybutadiene, styrene-butadiene rubber (SBR), butadiene-acrylonitrile rubber, polychloroprene (Neoprene), butyl rubber, polysulfide, silicone rubber, urethane rubber, polyacrylate, epichlorohydrin homo and copolymers, propylene oxide rubber, fluorosilicone rubber, fluorocarbon rubber, chlorosulfonated polyethylene, chlorinated polyethylene, ethylene-propylene rubber, nitroso rubber and phosphonitrilic rubber. The properties of the sleeve are, to a large extent, dependent upon the intended use of the sleeve. Thus, if the sleeve is to be used primarily as an electrical insulation, its electrical properties will be of primary importance. On the other hand, if the sleeve will be subjected to much physical abuse, it may be necessary to provide a sleeve which has toughness, good flame resistance, good solvent resistance, etc. For high voltage uses, it may be desirable to have a sleeve which has been made semi-conductive by dispersing large amounts of suitable fillers or conductive particles in the sleeve or possesses resistance to tracking and/or erosion.

To some extent, the nature of the sleeve is dependent upon the nature of the restraint as is readily apparent to those skilled in the art. Thus, the force of recovery exerted by the expanded elastomeric sleeve cannot exceed either the strength of the restraint or of the bond between the sleeve and the restraint. Further, it is necessary to choose a sleeve which is compatible with the restraint to the extent that it can be bonded to the restraint. These and other aspects of the relationship between the sleeve, the adhesive bond and the restraint will become clear in the discussion of the invention set forth below.

THE RESTRAINT

According to the present invention, the recoverable sleeve 2 is held in its extended or stretched condition by external tubular restraint 1. This restraint is depicted in FIG. 1 as being a tube having a circular cross section. However, any tubular article, i.e., an article at least a portion of which is closed in cross section, may be employed.

The restraint may be made of any suitable material such as rigid polymeric material, metal, ceramic and particularly porous cement, wood or wood products such as paper, resin reinforced or impregnated paper, etc. In general, it is necessary only to use a material having sufficient strength to hold the recoverable material in its extended condition without being deformed or collapsed.

It is further desirable that the restraint be capable of being bonded to the recoverable sleeve so that it will hold the recoverable sleeve in its extended condition until recovery of that sleeve is desired. The bond may be formed by adhesion directly between the sleeve and the restraint or by bonding the sleeve and restraint with an adhesive.

Suitable outer restraints of polymeric material include any rigid thermoplastic including polyvinylchloride and its copolymers, for example, with vinyl acetate, polyethylene and cross-linked polyethylene, polystyrene, copolymers of styrene such as copolymers of styrene and acrylonitrile, ABS polymer, etc.

In accordance with this invention, rapid attack and destruction of the bond between the restraint and the elastomeric sleeve may be accomplished by use of a solvent which will destroy the bond. Thus, it may be desirable to introduce holes or pores at the various intervals in the outer restraint to allow direct contact with the bond at many locations. For this purpose, a porous ceramic outer restraint may be desired.

In many applications, it is undesirable to have the restraint present after the sleeve has been recovered. Thus, means for removal of the restraint are desired. Restraints of frangible materials which can be broken by shattering, e.g., with impact, may be used for this purpose.

Figure 5:
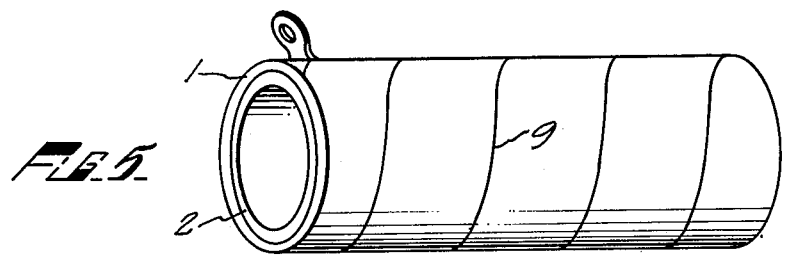
FIG. 5 is a perspective view of the article of the invention illustrating a removable restraint.

Other types of removable restraints include metallic or rigid plastic restraints having serrations or scores of the type shown at 9 in FIG. 5. With such a restraint, the metal or plastic restraint can be peeled away after shrinkage of the tubing has been accomplished.

It should be understood that this application is not limited to the particular means for removing the restraint after recovery. Thus, in addition to breaking, peeling, or cutting off as a removal means, the outer restraint may, for example, be dissolved in a suitable solvent.

Figure 3:
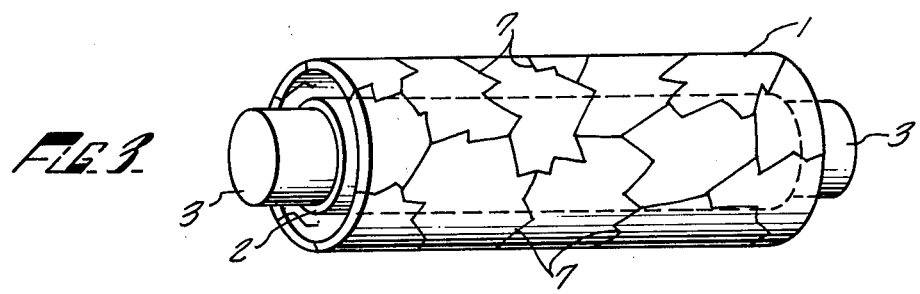
FIG. 3 is a perspective view of the recoverable sleeve after it has been recovered onto a substrate but before the restraint has been removed.
Figure 4:
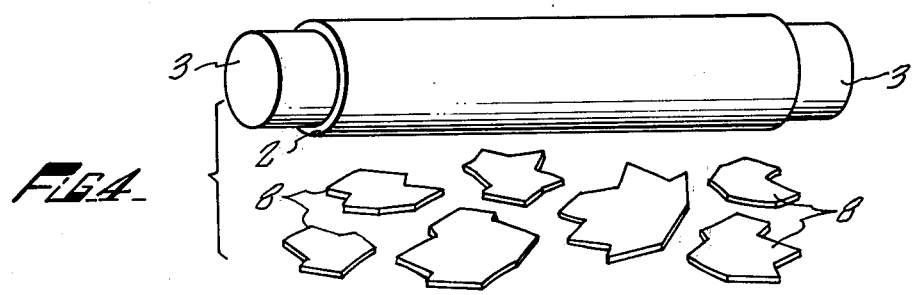
FIG. 4 is a perspective view of the recoverable sleeve on a substrate after the restraint has been reomved.

A particularly convenient means of forming a removable restraint is to form the restraint from polyvinylchloride which will fracture when given a sharp blow. Thus, after the elastomeric sleeve has peeled away from the restraint and come to its final recovered position on the substrate, the polyvinylchloride restraint can simply be given a blow with a hammer causing it to shatter and disengage from the recovered elastomeric tube. Alternatively, the restraint may be cracked before shrinkage of the sleeve. Then, the sleeve may shrink upon the application of solvent and the restraint may be peeled away upon the application of solvent. FIG. 3 illustrates this procedure. The sleeve 2 has been shrunk and is in tight fitting contact with substrate 3. The frangible outer restraint 1, which it is desired to remove, has just been given a blow causing fracture lines 7. Immediately after the fracture lines 7 have occurred, restraint 1 will fall away as shown in FIG. 4.

FIG. 5 is illustrative of a removable metallic or rigid plastic outer restraint. There, the outer metallic or plastic restraint 1 is scored or serrated or in some other way weakened along the lines 9. After weakening of the bond between elastomeric sleeve 2 and metallic restraint 1 and recovering of the elastomeric sleeve 2, restraint 1 can be removed by peeling it off along the weakened lines 9. For convenience, a pullring 10 of the type supplied on beverage cans may be provided.

THE BOND

The bond between the elastomeric sleeve and the outer restraint should be sufficiently strong so that the bond will prevent separation of the expanded elastomeric sleeve from the restraint under normal conditions of storage and handling over a long period of time. Further, the bond must be susceptible to being weakened thus allowing the elastomeric sleeve to peel away from the restraint on the application of a solvent to the bond line.

The bond may be formed simply by adhesion of the sleeve to the restraint without the use of any additional bonding agent. Such adhesion may occur when two polymeric materials are joined together, particularly at an elevated temperature such that they are both tacky. For example, in using a polyvinylchloride restraint for a neoprene elastomeric sleeve, it has been found convenient to injection mold the polyvinylchloride around the neoprene sleeve. At the injection molding temperatures, a bond is formed between the polyvinylchloride restraint and the neoprene sleeve.

It is frequently desirable to use adhesives to insure a suitable bond between the sleeve and the restraint. Any adhesive which will provide a strong enough bond to prevent premature recovery of the sleeve and yet will permit peeling away of the sleeve from the restraint upon the application of a solvent to the bond line may be used.

In general, hot melt adhesives are preferred. A hot melt adhesive would normally be applied by coating one or both surfaces with a solution of the adhesive, allowing the solvent to evaporate and then bringing the surfaces together under the application of heat and pressure.

A preferred hot melt adhesive for neoprene-PVC is a multisegmented block copolymer comprising units of polytetramethyleneether and polytetramethyleneteraphthalate. A polymer of this type is sold by DuPont under the trade name HYTREL. This adhesive forms a strong bond between Neoprene and polyvinylchloride and yet can be readily weakened by application of a number of solvents.

Various copolymers may be used as adhesives such as copolymers of ethylenevinylacetate, e.g., ELVAX from DuPont copolymers of ethylene-ethylacrylate, etc. Terpolymers such as terpolymere of ethylene, vinylacetate, and methacrylic acid may also be used. These adhesives may be used alone or with tackifiers.

Other hot melt adhesives suitable in the practice of this invention are polyamide resin adhesives. Exemplary of such adhesives are those available from General Mills under the trade name VERSALON, polyester adhesives (see, e.g., DuPont Technical Bulletin No. 17—"Polyester Adhesives") and the wide variety of polyvinyl, polybutene, and polyacrylate adhesives with which the art is familiar.

Various rubber based adhesives such as those based upon silicone, nitrile, and neoprene may be used.

In general, any adhesive is suitable if it has good affinity for the surface of the restraint and the sleeve and is resistant to creep under load. Further, the bond must have susceptibility to solvent attack so that upon the application of solvent to the bond line between the restraint and the sleeve, the bond weakens sufficiently so that the sleeve peels away from the restraint. Preferably the adhesive is thermo-plastic so that it will soften on heating to flow and ultimately wet the surface of both the restraint and sleeve.

Any suitable method of applying the adhesive to the surfaces of the sleeve and/or the restraint may be employed. A suitable method of application is to apply the adhesive from solution to one or both surfaces and allow the solvent in the adhesive to evaporate, bringing the surfaces together under the application of pressure and, if desired, heat to form a strong bond.

In a preferred embodiment of this invention, the outer restraint is injection molded around the sleeve. In that case, the adhesive is applied to the surface of the elastomeric sleeve prior to the time of injection molding. In general, it is desired that the peel strength of the adhesive bond be greater than 10 pounds per inch and preferably that the peel strength be greater than 20 pounds per inch. However, there is no absolute requirement with regard to peel strength. Thus, the important consideration is whether the bond or peel strength is sufficient to prevent the sleeve from peeling away from the restraint during storage or at any time prior to the time when it is desired to shrink the sleeve down about the substrate. Of course it is within the scope of this invention to provide an inner restraining core, e.g., a cardboard tube, to prevent premature recovery. If the force tending to cause the sleeve to shrink and peel away from the restraint is not great, a high bond or peel strength is not so necessary. On the other hand, if a sleeve having an extremely high retractive force is employed, it is necessary to use an adhesive which will form a bond having a high bond or peel strength.

THE SOLVENT

When it is desired to cause shrinking of the sleeve, the bond between the sleeve and the restraint is weakened or destroyed by the application of solvent at the bond line. Any solvent which will sufficiently weaken the bond to allow the sleeve to peel away from the restraint and shrink over a substrate may be used. Among those solvents which may be used are: chloroform, methylene chloride, N,N-dimethylformamide, ethyl acetate, acetone, butyl cellosolve, methyl ethyl ketone, and trichloroethylene.

Many other suitable solvents may be used depending upon the nature of the adhesive used. It should be realized that, in this application, the term "solvent" does not necessarily indicate that the solvent will dissolve the adhesive material. Rather, "solvent" is used to indicate any material which will destroy or weaken the bond between the sleeve and the restraint. Thus, for example, acetone which is not a solvent for HYTREL will weaken the HYTREL bond between a neoprene sleeve and a polyvinylchloride restraint 5 times faster than will chloroform which is a solvent for the HYTREL.

Figure 6:
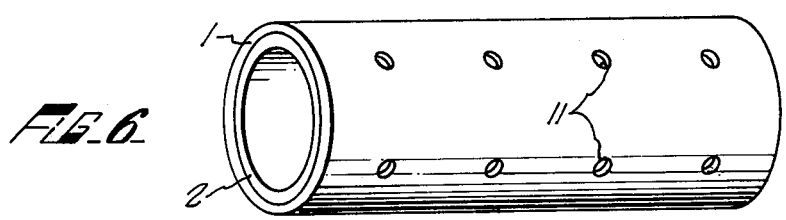
FIG. 6 is a perspective view of the article of the invention illustrating a restraint construction.

Any desired method of applying the solvent to the bond line may be employed. A convenient method of applying the solvent is simply to spray it along the edge of the article. This application is indicated in FIG. 1 wherein solvent 5 from nozzle 4 is sprayed along the bond line 6. As the sleeve peels away from the restraint, the nozzle can be directed to apply solvent along the remaining bond line. As previously indicated, a porous outer restraint comprising a material such as ceramic may be desirable. An advantage of such a porous restraint is that solvent can be applied to the outer surface of the restraint so that it will travel through the pores and contact substantially all parts of the bond simultaneously. Another method of obtaining rapid and complete contact of the bond line with solvent is illustrated in FIG. 6 wherein the restraint has a series of holes 11 communicating from the outer surface to the bond between the restraint and the sleeve. Solvent applied to the outer surface will penetrate through these holes to rapidly contact and weaken the bond. A similar result can be achieved by fracturing a frangible restraint and allow the solvent to penetrate to the bond line through the fractures.

The bond line attacked by the solvent may be the adhesive itself, the adhesive sleeve interface, the adhesive restraint interface, or all of these bond areas. Thus, when weakening of the bond line is referred to, it simply means that the adherence between the sleeve and restraint is weakened, in some manner, to the extent that the sleeve will peel away from the restraint.

The recoverable sleeve may be coated on its internal surface with various materials for contacting the substrate. Thus, an adhesive such as a contact adhesive or a mastic may be applied to the interior surface of the recoverable sleeve so that the sleeve will form a bond with a substrate about which is recovered. Because the recoverable sleeve of this invention does not require heat for its recovery, it is preferred to employ an adhesive which does not require the application of heat to form a strong bond with a substrate. In this regard, various contact or pressure sensitive adhesives may be employed.

In addition to adhesives, various other materials may be employed on the internal surface of the recoverable sleeve. For example, materials of the type described in U.S. Pat. No. 3,396,460 may be used. In many instances, it is desired to coat the inside of the sleeve with materials which will flow under the application of pressure at the temperature of application. Preferably, these materials will adhere to both the sleeve and the substrate. Particularly suitable materials for this application are pressure sensitive adhesives.

The recoverable article of the present invention has a wide range of applications. Thus, it can be used for any application in which heat recoverable sleeves are normally used. For example, it can be used for insulating splices in electrical conductors in both low and high voltage applications. The article may be used for covering repairs or joints in electronic equipment. The sleeves are particularly suitable for use in covering splices and repairs in telephone cables and cable TV lines.

An area where heat recoverable sleeves have had a great deal of use in recent years is for the repairing of splices in electrical cables used in mines. The sleeves of the present invention are particularly suitable for such mine cable splices because they do not require the application of heat which is usually accomplished by the use of a torch. This may be a major advantage, particularly in gassy mines where torches present great safety dangers.

FABRICATION PROCEDURES

A number of methods are available for manufacturing the articles of this invention. Simply stated, the articles can be formed by bonding the sleeve, in the expanded or extended state, to an outer restraint. One convenient method of accomplishing this is to form an outer restraint of the desired size and an elastomeric sleeve of the desired final diameter. Then, the inner surface of the restraint and the outer surface of the elastomeric sleeve are coated with a suitable adhesive and the elastomeric sleeve is expanded into contact with the restraint by internal air pressure, a mandrel, etc. The sleeve is held in contact with the restraint for a period of time sufficient for a bond to be formed whereupon the mandrel or internal pressure are removed.

A preferred technique for forming the article comprises first forming the sleeve and then injection molding the outer restraint around the sleeve. In this method, the sleeve is first coated with adhesive. Then, the outer restraint material is injection molded around the sleeve. The two layers may also be formed by dual extrusion. Before the restraint has hardened on cooling, the restraint and sleeve are expanded by a mandrel or compressed air to give the desired expansion and desired final inside diameter to the sleeve. While the sleeve is in the expanded condition, the restraint is cooled and hardened and upon removal of the mandrel or release of the air pressure, the sleeve remains bonded to the restraint and held in the expanded condition.

The injection molding process described above has been found to be particularly suitable for use with a combination of a neoprene sleeve, a HYTREL adhesive, and a polyvinylchloride restraint. However, it will be readily obvious that the process can be carried out using a wide range of suitable materials.

As indicated herein, a wide variety of materials may be used to manufacture the article of the present invention depending upon the desired properties of the article. In the case of mine splices, it is necessary to provide a recoverable sleeve which has great strength and abrasion resistance in the recovered state. These requirements are dictated by the mechanical abuse which mine cables must survive. Thus, properties such as tensile strength, elongation, flammability, abrasion resistance, and dielectric strength are all important considerations for such sleeves. Additionally, it is important that the sleeves resist peeling or creeping away from the splice which they cover. Typically, mine sleeves are wound on and off cable reels in the mines, are pulled over sharp rock surfaces, and are frequently exposed to impact against sharp edges.

It has been found that a combination of materials used in accordance with this invention will provide a recoverable article having properties sufficient for use in the extremely demanding environment of the mine. In particular, a recoverable elastomeric mine sleeve requires an extremely high recovery force and thus it has been necessary to provide a restraint and adhesive which will provide a strong bond between the restraint and sleeve to maintain the sleeve in the desired extended condition until recovery is desired.

According to the present invention, an elastomeric sleeve having a good combination of properties and being suitable for use as a mine splice sleeve comprises a neoprene sleeve having the following composition:

TABLE I

| Component | Parts By Weight A | B |
|---|---|---|
| Neoprene Rubber | 100 | 100 |
| Phenyl-alpha-napthylamine | 2 | 2 |
| Magnesium Oxide | 1 | 1 |
| Stearic acid | 0.5 | 0.5 |
| HAF Carbon Black | 5 | 5 |
| Hydrated alumina | 10 | 10 |
| Precipitated Silica | 15 | 15 |
| Antimony oxide | 15 | 15 |
| Tri (2-ethylhexyl) phosphate | 4 | 4 |
| Zinc oxide | 5 | 5 |
| N-Cyclohexyl-2-benzothiazole sulfenamide | 1 | 0.75 |
| A treated amine sold by DuPont as TA-11 | 2 | — |
| Tetramethyl thiourea | — | 0.75 |

When cured at 350° F for 15 minutes, a slab 0.075 in. thick and a tube having an inside diameter of 0.75 in. and an outside diameter of 1.0 in. from this composition was found to have the following properties:

TABLE II

| SLAB PROPERTIES | A | B |
|---|---|---|
| Tensile Strength, psi | 4400 | 3000 |
| Ultimate Elongation, % | 710 | 650 |
| Tensile Stress at: | | |
| 100% Elong. | 290 | 260 |
| 200% Elong. | 650 | 385 |
| 300% Elong. | 1150 | 610 |
| TUBE PROPERTIES | | |
| Tensile Strength, psi | 1990 | 970 |
| Ultimate Elongation, % | 510 | 430 |
| Tensile Stress at: | | |
| 100% Elong., psi | 250 | 230 |
| 200% Elong., psi | 460 | 330 |
| 300% Elong., psi | 850 | 500 |
| Tensile Strength at 150° C, psi | 370 | 280 |
| Ultimate Elongation at 150° C, % | 200 | 150 |
| Tear Strength (DieC), pli | 370 | 215 |
| Tear Strength (DieC) at: | | |
| 150° C, pli | 90 | 80 |
| Tape Abrasion (¼" strip, 250" tape, 2 lb. wt., 1504 Grid, mil) | 35 | 36 |
| Tensile Set (200% elong. at RT) | | |
| After 24 hrs., % | 1 | 2 |
| After 7 days, % | 6 | 10 |

Using the compositions of Table I, tubes of neoprene having an i.d. of 0.75 in. and an o.d. of 1.0 in. was molded. Each neoprene tube was placed in an injection mold and a polyvinylchloride composition as set forth below in Table III was injected around it. Two suitable polyvinylchloride compositions are as follows:

TABLE III

| Component | A | B |
|---|---|---|
| Polyvinylchloride | 100 | 100 |
| An organotin stabilizer sold by M&T Chemicals | 3 | 3 |
| A cycloaliphatic epoxy sold by Ciba-Geigy | 4 | 4 |
| Low molecular weight polyethylene | 2 | 2 |
| Low molecular weight nitrile rubber | 10 | — |

Prior to the injection of the polyvinylchloride, the outer surface of the neoprene sleeve was abraded and coated with a 5% solution of HYTREL in chloroform and dried. Prior to injection molding, the tubes were preheated to soften the adhesive. Injection Molding Machine using the conditions set forth in Table IV, below:

TABLE IV

| Machine Temperature | |
|---|---|
| Nozzle heat, ° F | 390 |
| Front heat, ° F | 375 |
| Center heat, ° F | 365 |
| Rear heat, ° F | 300 |
| Mold Temperature | |
| Manifold, ° F | 275 |
| Front plate, ° F | 175 |
| Back plate, ° F | 200 |
| Machine Settings | |
| Injection time, seconds | 15 |
| Cooling time, seconds | 15 |
| Total cycle time, seconds | 60–90 |

The resulting tubular article was expanded by preheating the tube and expanding 100 to 200% using air pressure to expand the tube into a cold expansion mold. The peel strength was found to be about 40 lb/in. between the polyvinylchloride restraint and the Neoprene sleeve.

The tubular articles of this invention may be expanded using the apparatus and method described in Greuel application Ser. No. 436,675 entitled EXPANSION APPARATUS AND PROCESS and filed Jan. 25, 1974.

The tube was recovered by spraying solvent onto the bond line at the end of the article. A suitable solvent is 30% chloroform or acetone and 70% Freon 12. Using between 45 and 75 grams of solvent resulted in recovery of the Neoprene sleeve by complete peeling away from the restraint in about 5 minutes. The restraint was then fractured with a hammer and removed.

The tubular articles of this invention may be expanded using conventional apparatus and methods for example by means of mandrels or using hydraulic pressure.

It is to be understood that the foregoing examples are merely illustrative of the invention and that the scope is not limited to these exemplary embodiments of the invention. For example, metallic restraints may be used with suitable adhesive to bond the metal and elastomer. Thus, the scope of the invention is limited only by the scope of the appended claims.

We claim:

1. The method of covering a member comprising:
   positioning over said member a recoverable tubular article comprising;
   a tubular sleeve held under tension in an expanded condition such that upon the release of the tension the sleeve tends to assume a small diameter;
   a restraint having an essentially tubular configuration;
   a bond between the sleeve and the restraint to hold said sleeve in its expanded condition, said bond being capable of being sufficiently weakened by the application of a solvent to allow the sleeve to pull away from the restraint and return to its smaller diameter; and
   applying a solvent to the bond between the sleeve and the restraint to thereby weaken the bond sufficiently to cause the sleeve to peel away from the restraint and shrink down about said member.

2. The method of claim 1 wherein solvent is sprayed on the bond at the edge of the article.

3. The method of claim 1 wherein the solvent is applied to the outer surface of a restraint having pores communicating with the bond.

4. The method of claim 1 wherein, after shrink down of the sleeve, the restraint is removed.

5. The method of claim 1 wherein the restraint, having been made from a frangible material, is fractured by being struck and the solvent is applied to the outer surface of the fractured restraint to penetrate to the bond through the fractures.

* * * * *